Patented Aug. 10, 1954

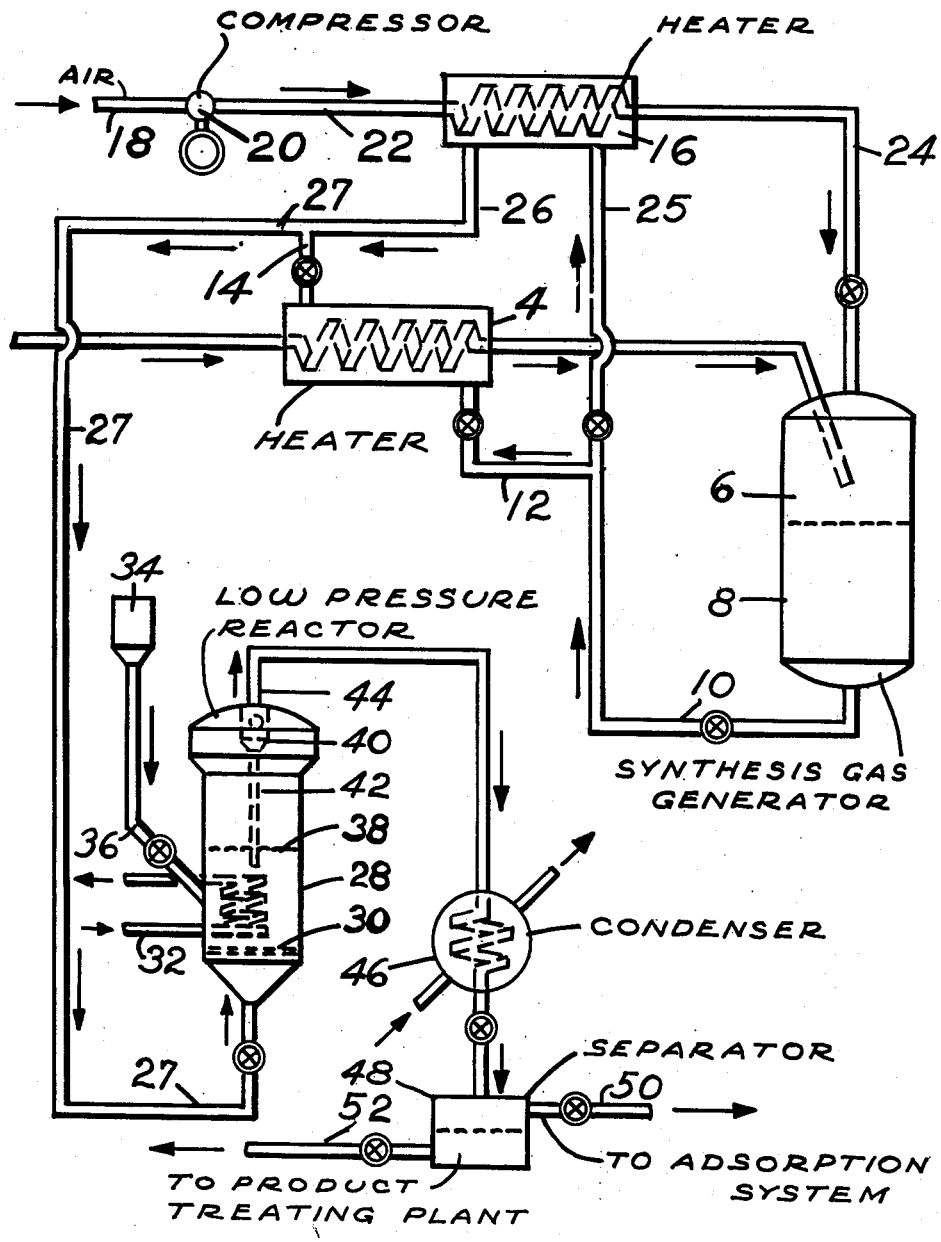

2,686,195

UNITED STATES PATENT OFFICE 2,686,195

HYDROCARBON SYNTHESIS

Don R. McAdams and Fred J. Buchmann, Baton Rouge, La., assignors to Standard Oil Development Company, a corporation of Delaware Application December 10, 1949, Serial No. 132,322

4 Claims. (Cl. 260—449.6)

The present invention relates to the catalytic reaction between carbon monoxide and hydrogen to form valuable liquid hydrocarbons and oxygenated hydrocarbons. More particularly, the present invention is concerned with improvements in the reaction based on an improved composition of catalyst employed in the reaction.

The synthetic production of liquid hydrocarbons from gas mixtures containing various proportions of carbon monoxide and hydrogen is a matter of record, and numerous catalysts, usually containing an iron group metal, have been described which are specifically active in promoting the desired reactions at certain preferred operating conditions. For example, cobalt supported on an inert carrier is used when relatively low pressures of about 1 to 5 atmospheres and low temperatures of about 300 to about 425° F. are applied in the manufacture of a substantially saturated hydrocarbon product while at higher temperatures of 450°–750° F. and higher pressures of 15–40 atmospheres required for the production of unsaturated and branch chained products of high antiknock value, iron type catalysts are more suitable.

In both cases, the reaction is strongly exothermic and the utility of the catalyst declines steadily in the course of the reaction chiefly due to deposition of non-volatile conversion products such as paraffin wax, carbon, and the like on the catalyst.

The extremely exothermic character and high temperature sensitivity of the synthesis reaction and the relatively rapid catalyst deactivation have led, in recent years, to the application of the fluid solids technique wherein the synthesis gas is contacted with a turbulent bed of finely divided catalyst fluidized by the gaseous reactants and products. This technique permits continuous catalyst replacement and greatly improves heat dissipation and temperature control.

Most processes for synthesis of hydrocarbons from synthesis gas obtained from coal or natural gas involve the production of relatively pure oxygen for the partial combustion of these raw materials to form CO and $H_2$ which are then reacted in a second step to form the desired hydrocarbons. In order to produce a highly unsaturated hydrocarbon product of high octane value, it is generally considered desirable to operate the synthesis reaction at high pressures of about 400 p. s. i. g. in the presence of an iron catalyst. This, however, involves production of relatively pure oxygen, also at high pressures. It would be uneconomic to employ air at high pressure rather than oxygen, because the recycle requirements associated with an iron catalyst to obtain high overall consumption of $H_2$ and CO would result in the undesirable recirculation of a gas containing an ever-increasing amount of nitrogen.

As indicated above, it would be highly desirable to operate a hydrocarbon synthesis process by the fluid solids technique wherein the synthesis gas is prepared at lower pressures by air instead of by oxygen at high pressures, and wherein the synthesis itself is carried out at moderate instead of at high pressures, and wherein a valuable olefinic motor fuel is obtained. The art shows many attempts in this direction in fixed bed processes. Thus, it has been attempted to prepare high octane motor fuel using a thoria promoted cobalt on silica gel catalyst. However, it was found that when the variables were adjusted in an effort to improve the liquid yield and quality of the product, the yield of liquid products increased somewhat with pressure when the temperature was held constant, but the yield of wax increased also. This is quite undesirable because wax formation renders it extremely difficult to maintain a fluidized bed in the reactor. On the other hand, if the pressure is held constant in the relatively low pressure areas where cobalt catalyst functions well, that is, in the region of 15 to about 75 p. s. i. g., the olefin content of the product is low, and attempts to increase the olefinicity by increasing the temperature caused a decrease in liquid product yield and an increase in gas formation.

On the other hand, experience has indicated that operation with a conventional iron catalyst at the lower pressures is usually accompanied by severe carbonization of the catalyst as well as by heavy formation of wax, both making the maintenance of a fluid catalyst bed a very great difficulty. Carbonization further causes rupture of iron catalysts resulting in formation of fines which eventually make impossible maintenance of fluidization and control of temperature.

It is the principal object of the present invention to provide an improved hydrocarbon synthesis process operable at moderate pressures wherein high yields of valuable liquid synthesis products having a high degree of unsaturation are obtained and wherein wax formation is minimized.

It is also an object of the present invention to provide a combination process wherein air at low pressures rather than oxygen at elevated pressures may be employed in the preparation of hydrocarbon synthesis gas which in turn is converted at relatively low pressures into liquid hydrocarbons of high antiknock properties, wax formation being minimized therein.

Other objects of the invention will in part be obvious and will in part appear hereinafter.

In the production of hydrocarbons from CO and $H_2$ utilizing the fluidized solids technique, in particular where the products are to be employed in the production of motor fuels, the criterion of a successful process, in terms of product quality are (1) a high yield of $C_4+$ product, (2) a high selectivity to olefins, and (3) a low selectivity to wax. Olefinic hydrocarbons are, of course, superior to paraffinic hydrocarbons as anti-detonating fuels. The formation of wax is a most undesirable occurrence when operating by means of the fluid solids technique, because wax formation renders it extremely difficult to maintain a fluidized bed in the reactor; this decrease in fluidization is accompanied by loss of temperature control, which results in shut-down of operation.

It is the purpose of the present invention to provide a catalyst for a once-through low pressure hydrocarbon synthesis operation which will give high yields of olefinic product and which will give a gasoline product with minimum quantities of wax.

It has now been found that the objects and advantages of the invention may be realized by employing in a once-through low pressure hydrocarbon synthesis process, an iron catalyst supported on an activated carbon support, promoted with potassium carbonate, and containing on the surface, a minor proportion of cobalt.

Prior to the present invention, it has been found that when iron is deposited upon an active carbon support, an active hydrocarbon synthesis catalyst is obtained which formed little wax and gave high yields of product boiling in the gasoline range. However, the olefinicity of the product was very low, making it of little value as a motor fuel without further treatment. When this catalyst was promoted with a potassium salt promoter, as $K_2CO_3$, under similar synthesis conditions, the olefinicity increased substantially, but so also did the wax content, thus making the process unsuitable for application to the fluid solids technique.

The surprising result has now been found that when an alkali metal salt promoted catalyst comprising iron on an active carbon support is treated to deposit a minor quantity of cobalt upon the surface, the wax forming tendencies of the catalyst are suppressed. This result is particularly surprising in view of the well known fact that cobalt synthesis catalysts are characterized in being notoriously wax-forming and tending to form saturated straight chain hydrocarbons.

The invention will best be understood by referring to the accompanying diagrammatic representation of a modification of the present invention, wherein equipment and flow of material suitable for carrying out a preferred embodiment of the invention are illustrated.

Referring now in detail to the drawing, natural gas from any convenient source preheated in preheater 4 is passed to synthesis gas producer vessel 6, which comprises a catalytic oxidation zone. Simultaneously, air is passed through line 18 into compressor 20, wherein it is moderately compressed to about 50–100 p. s. i. g. and the compressed material is passed through line 22 and preheater 16, wherein it is preheated to about 1200° F., and introduced into synthesis generation plant 6. In generator 6 partial oxidation mainly to CO and $H_2$ takes place. The temperature in the oxidation zone may be of the order of 2000°–2500° F., the lower portion 8 of generator 6 may comprise a catalytic reformer bed, containing a reforming catalyst such as nickel or copper on magnesia, and any $CO_2$ and $H_2O$ formed as a result of combustion in the upper part of the generator will reform unreacted methane to produce further quantities of $H_2$ and CO.

The hot synthesis gases leaving generator 6, which are at a temperature of about 1600°–1800° F. are passed through line 10 and are preferably employed to preheat the incoming natural gas and air in preheaters 4 and 16, respectively, the synthesis gas stream being divided for this purpose to pass through lines 12 and 14, and through lines 25 and 26. The reunited synthesis gas stream in line 27, which has been cooled as indicated to about 450°–600° F., and may be further cooled if desired, is passed to the bottom of hydrocarbon synthesis reactor 28. The latter is preferably in the form of a vertical cylinder with a conical base and an upper expanded section, and has a grid (or screen) located in the lower section to effect good gas distribution.

Within reactor 28, a mass of the catalyst described below is maintained in the form of a finely divided powder having a particle size distribution from about 100–400 mesh, preferably about 150–250 mesh. The catalyst comprises reduced iron supported on an active carbon carrier promoted by not less than 0.1% and not more than 5.0% $K_2CO_3$ on the total weight, and furthermore, contains about 1 to 3% Co on the total weight. The weight of iron is preferably 8 to 20% of the total catalyst, and the iron is distributed uniformly on the catalyst by any desired process, such as impregnation, thermal decomposition of iron pentacarbonyl, etc. Thus for illustrative purposes, catalyst supplied to reactor 28 from catalyst hopper 34 through line 36 may have an iron content of about 8 to 20%, a carbon content (as carrier) of 74 to 90%, a promoter content of 0.3% to 3.0% $K_2CO_3$, and a cobalt content of 1 to 3%.

The synthesis gas mixture, having any desired molar ratio of $H_2$/CO, flows upwardly through grid 30. The superficial linear velocity of the gas within the reactor is kept within the approximate range of 0.1–3 feet per second, preferably about 0.4–1.5 feet per second so as to maintain the catalyst in the form of a dense, highly turbulent fluidized mass having a well defined upper level 38 and an apparent density of from about 30 to 125 lbs. per cubic foot, depending upon the fluidization conditions.

In accordance with the invention, the pressure within reactor 28 is kept within the approximate limits of 50 to 100 p. s. i. g., preferably about 55–75 p. s. i. g. and the temperature is maintained constant within the limits of about 550° to 650° F. Surplus heat from the exothermic reaction may be withdrawn by any conventional means, such as cooling coil 32.

Only a small portion of the powdered catalyst is carried into the disengaging section of the reactor above level 38, and these catalyst particles are separated from the reaction products in a conventional gas-solids separator, such as cyclone 40 and returned to the dense bed via dip pipe 42. The rate of gas throughput in terms of volume of gas ($H_2+CO$) per weight of catalyst per hour, or v./hr./w., is in the range of 2 to 20, and is so adjusted as to give the desired conversion without need for any recycle of tail gas.

Product vapor and gases are withdrawn overhead from reactor 28 and are passed through line 44 and condenser 46 to liquid products separator 48, wherein liquid products are separated from gases. The liquid products, containing high yields of olefins with little or no wax may be withdrawn through line 52 for further processing, such as fractionation, cracking of the gas oil fraction, isomerization, polymerization, hydroforming, etc., all in a manner known per se.

The uncondensed gases, comprising lower molecular weight hydrocarbons as well as unreacted synthesis gas and nitrogen are preferably passed through line 50 to a fluidized solids active carbon adsorption plant, wherein light hydrocarbons may be removed and recovered by desorption at the lower pressures of the present operation. This represents a considerably more economical process than the conventional oil absorption of tail gas.

The present invention admits of numerous modifications apparent to those skilled in the art. Thus, instead of producing synthesis gas from partial combustion of natural gas or methane by air at low pressures, synthesis gas may also be prepared by the water gas reaction from coal. In such case, depending on how heat is furnished to the process, either by direct combustion of coke or coal within the water gas generator with air or by recycling of hot combustion solids from a burner vessel, the synthesis gas may or may not contain appreciable quantities of nitrogen. However, the ratio of $H_2/CO$ in synthesis gas prepared from coal is about 1/1, and such a synthesis gas may be passed through a shift converter to increase the feed gas ratio from about 1/1 to about 2/1. In such a system, also, a desulfurizing step would be introduced, such as the passing of the synthesis gases through spent synthesis catalyst to remove sulfur.

As for the catalyst, various modifications of the above type catalyst may show similar and further improvement in the synthesis reaction.

The invention may be further illustrated by the following specific examples, which represent fixed bed laboratory data obtained in using the promoted catalyst of the present invention.

*Example I*

A preferred modification of the catalyst of the present invention may be prepared as follows:

Activated carbon pellets purchased from Columbia (Grade 4SX) were crushed and screened. Fine material has been used previously for fluid catalysts but this particular batch was screened 40% between 14 and 20 mesh plus 60% between 20 and 35 mesh because the testing of the catalyst was to be in fixed bed operation. The small granules of activated carbon were fluidized by a stream of nitrogen in a bed in a heated glass reactor. With the fluidized bed of carbon at 450° F. temperature, iron pentacarbonyl vapors $Fe(CO)_5$ were introduced into the nitrogen stream. The pentacarbonyl was decomposed upon contacting the hot carbon effecting a very tenacious deposit of iron metal on the carbon. The iron-carbon mixture was then referred to as catalyst A and analyzed 11.5% Fe.

Cobalt and potassium carbonate were added to catalyst A in the following manner:

6.5 grams of cobalt nitrate hexahydrate

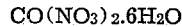
$$CO(NO_3)_2.6H_2O$$

were dissolved in the minimum amount of water required at room temperature (about 70°–75° F.) and precipitated with aqueous ammonia (28% $NH_3$ solution, not in excess. The final pH was 6.5 to 7.0. The precipitate was washed on a filter with distilled water to remove soluble nitrates. The precipitate was then dissolved in excess ammonia solution to which gaseous ammonia was added and 1½ cc. (about 2 grams) of glacial acetic acid. The resulting 60 cc. of solution was added to 64.5 grams (130 cc.) of catalyst A under nitrogen atmosphere and dried under nitrogen at 250–300° F. The dry weight was 68 grams. About 1.32 grams of $K_2CO_3$ in 45 cc. of water was added to the dry material and the mixture was redried under nitrogen at 250° F. The product was referred to as catalyst C. The final catalyst contains approximately 85.1% activated carbon
10.9% iron (as Fe)
2.0% cobalt (as Co)
2.0% $K_2CO_3$ on a reduced basis.

Prior to testing of the catalyst it was given a hydrogen treatment for 4 hours at 900° F. and 5000 volumes of hydrogen per hour per one volume of catalyst to insure nearly complete reduction.

*Example II*

Catalyst prepared substantially as described above was tested in a laboratory fixed bed hydrocarbon synthesis unit, and compared with other type catalysts as shown below. In all cases, the reaction conditions for the once-through operations included a pressure of 75 p. s. i. g., 600° F. temperature, and a feed rate of 200 volumes synthesis gas per volume catalyst per hour.

| Catalyst | A | B | | C | |
|---|---|---|---|---|---|
| Feed, $H_2/CO$ | 1.15 | 1.15 | 2.04 | 1.15 | 2.00 |
| CO Conversion, Percent | 79 | 83 | 92 | 88 | 95 |
| Yield, $C_4+/m^3H_2+CO$ Cons. | 207 | 207 | 203 | 202 | 195 |
| Product unsat., Init.—430° F. | <40 | 76 | 74 | 66 | 66* |
| Product Appearance | Clear | Very Waxy | Very Waxy | Clear | Clear |

*Total product unsaturation.

In the above example, the following catalysts were employed:

*Catalyst A.*—A catalyst prepared by decomposing iron pentacarbonyl on fluidized carbon. The catalyst contained 85.2% activated carbon and 14.8% iron.

*Catalyst B.*—Same catalyst impregnated with 2% $K_2CO_3$.

*Catalyst C.*—Catalyst prepared as in Example I, containing 10.9% iron, 2.0% cobalt (as metal), 2.0% $K_2CO_3$ and the balance activated carbon.

The above data clearly show that, whereas the unpromoted active carbon supported catalyst (A) gave good yield of $C_4+$ product, the latter was too saturated to be suitable for motor fuel.

When an alkali-metal salt promoter, such as $K_2CO_3$, was added (B), a considerably more olefinic product was obtained, but wax formation was excessive. Smaller amounts of $K_2CO_3$ than 2% also produced excessive wax, while the addition of $K_2CO_3$ in amounts of 0.3% and less did not increase the olefin content of the product to a satisfactory level. The addition of cobalt (catalyst C), however, gave a product of satisfactory olefinicity with no visible wax. Furthermore, the catalyst has a high sensitivity for $C_4+$ product, and very good activity in terms of CO conversion.

Thus, in accordance with the invention, hydrocarbon synthesis operations may be carried out at low pressures in the presence of a catalyst consisting principally of iron supported on an active carbon carrier, promoted with 0.1% to 5.0% of $K_2CO_3$, preferably about 1.0 to 3.0%. Other promoters may be used, such as $Na_2CO_3$, $KNO_3$, and $KF$. However, to produce a substantially wax-free product, a portion of the iron must be replaced by cobalt; thus about 10 to 20%, preferably 15% by weight of the iron is replaced by cobalt. By use of this catalyst, high yields of valuable liquid unsaturated products are obtained with minimum quantities of wax. By dispensing with an oxygen unit and operating the synthesis gas generator with air, investment costs are substantially reduced.

While the foregoing description and exemplary operation have served to illustrate specific applications and results of the invention, other modifications obvious to those skilled in the art are within its scope.

We claim:

1. An improved low-pressure once-through process for preparing high yields of valuable olefinic hydrocarbons from synthesis gas containing appreciable quantities of nitrogen which comprises passing a gas mixture containing $H_2$ and CO in synthesis proportions diluted with nitrogen into a hydrocarbon synthesis reaction zone, contacting said gaseous mixture with a dense turbulent mass of finely divided synthesis catalyst consisting of an activated carbon support, said support carrying as active component from 8-20% of reduced iron metal promoted with 0.3 to 5.0% of a potassium compound and a minor amount of cobalt, maintaining a pressure of about 50-100 p. s. i. g. and a temperature of about 550°-650° F. within said zone, and withdrawing a product containing high yields of liquid olefinic hydrocarbon product substantially uncontaminated with wax.

2. The process of claim 1 wherein said catalyst is promoted with 2.0% $K_2CO_3$, said catalyst contains 10.9% iron and 2.0% cobalt, and reaction conditions within said zone comprise a pressure of about 75 p. s. i. g. and a temperature of about 600° F.

3. In the process of converting natural gas to liquid hydrocarbons wherein natural gas is oxidized with air to form synthesis gas and the synthesis gas containing $H_2$ and CO is passed to a hydrocarbon synthesis zone, the improvement which comprises contacting said gas in a single pass, no recycle operation, with a fluidized catalyst comprising an activated carbon support carrying a reduced iron-cobalt metal catalyst promoted with an alkali metal compound corresponding in amount to that represented by about 0.3–3% $K_2CO_3$, said iron comprising about 8–20% by weight of the total catalyst and said cobalt about 1–3%, maintaining a pressure of about 50–100 p. s. i. g. and a temperature of about 550–650° F. within said synthesis zone, and withdrawing a product containing high yields of liquid olefinic hydrocarbons.

4. An improved process for converting CO and $H_2$ to normally liquid hydrocarbons of high olefin and low wax content which comprises contacting CO and $H_2$ in synthesis proportions in a single pass, involving no recycle operation, under synthesis conditions comprising pressures of from about 50 to about 100 p. s. i. g. with a dense turbulent fluidized mass of finely divided synthesis catalyst, said catalyst consisting essentially of 10.9 weight per cent iron, 2.0 weight per cent $K_2CO_3$, 2.0 weight per cent cobalt and the balance activated carbon.

References Cited in the file of this patent

UNITED STATES PATENTS

| Number | Name | Date |
| --- | --- | --- |
| 1,798,288 | Wietzel et al. | Mar. 31, 1931 |
| 1,801,382 | Wietzel et al. | Apr. 21, 1931 |
| 1,996,101 | Dreyfus | Apr. 2, 1935 |
| 2,271,259 | Herbert | Jan. 27, 1942 |
| 2,274,639 | Scheuermann et al. | Mar. 3, 1942 |
| 2,347,682 | Gunness | May 2, 1944 |
| 2,598,647 | McGrath | May 27, 1952 |